United States Patent [19]
Takei et al.

[11] Patent Number: 6,125,092
[45] Date of Patent: Sep. 26, 2000

[54] OPTICAL HEAD ASSEMBLY

[75] Inventors: Yuichi Takei; Kazuo Kobayashi, both of Nagano, Japan

[73] Assignee: Sankyo Seiki Mfg. Co., Ltd., Nagano-ken, Japan

[21] Appl. No.: 09/130,620

[22] Filed: Aug. 7, 1998

[30] Foreign Application Priority Data

Aug. 12, 1997 [JP] Japan .................................. 9-217341

[51] Int. Cl.[7] ...................................................... G11B 7/00
[52] U.S. Cl. ............................................ 369/112; 369/109
[58] Field of Search .................................... 369/103, 109, 369/112, 118, 100, 44.37

[56] References Cited

U.S. PATENT DOCUMENTS 5,570,333  10/1996  Katayama ........................... 369/109 X
5,579,298  11/1996  Opheij et al. ....................... 369/109 X
5,594,712   1/1997  Yang ...................................... 369/112

FOREIGN PATENT DOCUMENTS 10-11773   1/1998   Japan .

*Primary Examiner*—Paul W. Huber
*Attorney, Agent, or Firm*—Reed Smith Shaw & McClay LLP

[57] ABSTRACT

An optical assembly comprises a light emitting device and an objective lens for converging light emitted from the light emitting device onto an optical recording medium. A first diffraction grating is included in which a first grating pattern is formed for diffracting said light emitted from the light emitting device to guide it to the objective lens. Also included are a light receiving element and a second diffraction grating in which a second grating pattern is formed for diffracting returning light from the optical recording medium to guide it to the light receiving element. First alignment marks are provided to either the first or second grating for aligning the diffraction grating having the marks with another element.

9 Claims, 7 Drawing Sheets

OPTICAL HEAD ASSEMBLY

BACKGROUND OF THE INVENTION a) Field of the Invention

The present invention relates to an optical head assembly used for recording to and reproducing from optical recording media.

b) Description of the Related Art

Optical head assemblies that reproduce from optical recording media such as CDs and DVDs are configured such that an objective lens converges laser light from a laser light source on a recording surface of an optical recording medium, and a photodetector detects returning light from the optical recording medium to reproduce data recorded on the optical recording media based on the detection result of the photodetector. An optical head assembly disclosed in JP Tokkai H7-302433 is configured such that a diffraction grating is placed on an optical path between the laser light source and objective lens, and thereby the laser light emitted from the laser light source is split in multiple laser beam and guided to the optical recording medium. Also, optical head assemblies disclosed in JP Tokkai H7-130021 and Tokkai H7-130223 are configured such that returning light from the optical recording medium is diffracted by a diffraction grating and guided to the photodetector.

Figure 7:
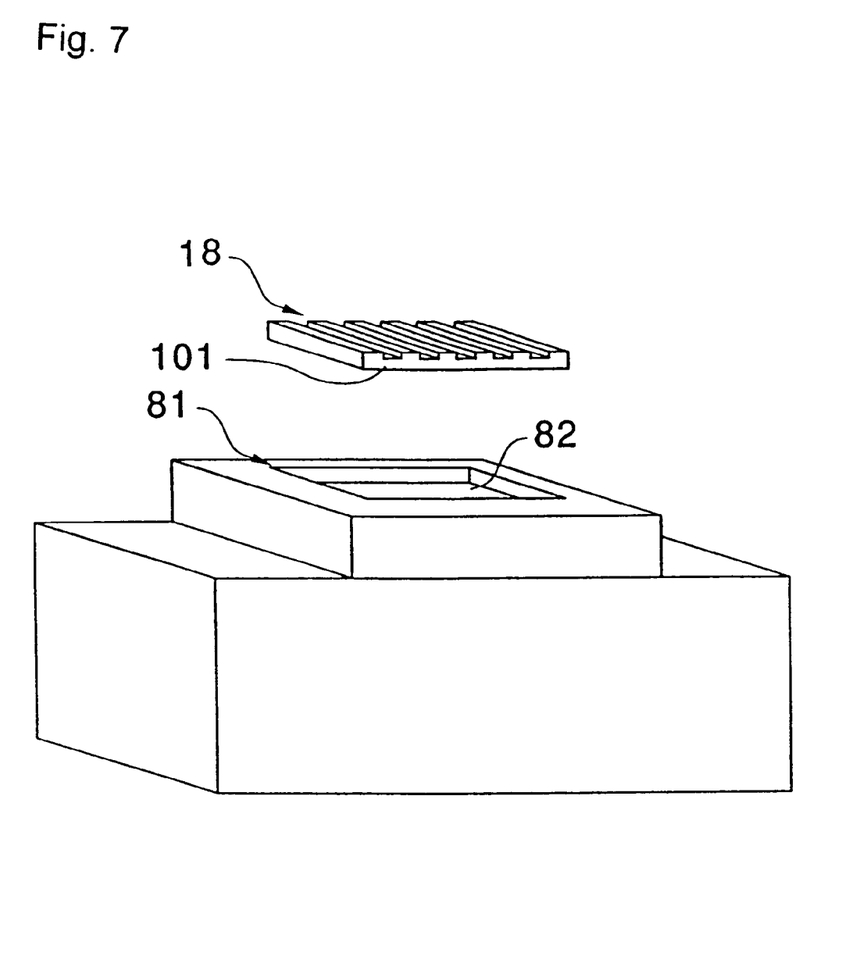
FIG. 7 is a perspective view showing how the diffraction grating is aligned and mounted in the unit case of the optical unit in a conventional optical head assembly.

In the optical head assembly configured in the above manner, as illustrated in FIG. 7, a recess portion 82 which is an alignment guide for mounting the diffraction grating 18 is formed in a diffraction grating 18 mounting region 81 formed in the optical head assembly to which the optical element is installed. By dropping (fitting) the diffraction grating 18 in the recess portion 82, an inner wall of the recess portion 82 and an outer peripheral surface 101 of the diffraction grating 18 fit properly to determine the mounting position of the diffraction grating 18.

Figure 8:
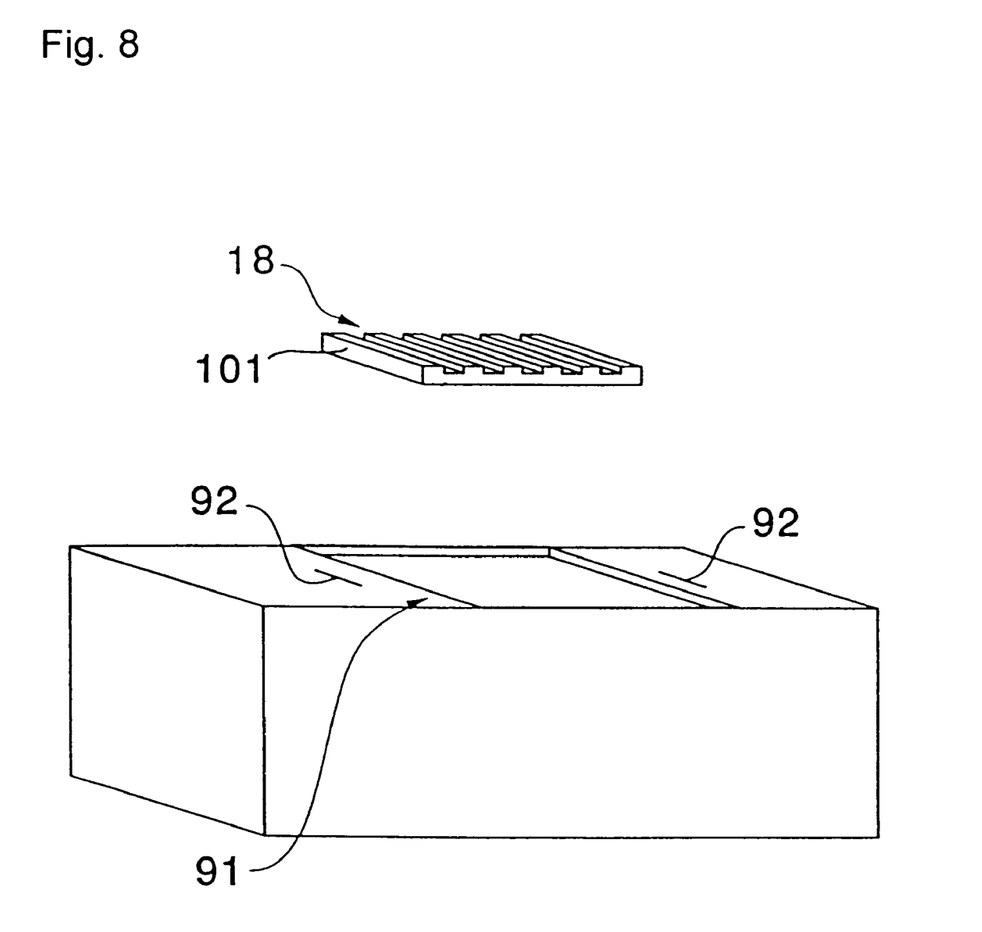
FIG. 8 is a perspective view showing how the diffraction grating is aligned and mounted in the unit case of the optical unit in another conventional optical head assembly.

Also, as illustrated in FIG. 8, the mounting position of the diffraction grating 18 may be determined by forming a diffraction grating 18 mounting region 91 on a top surface (in the figure) of the optical head assembly, to which the optical element is installed, as a flat portion, forming alignment marks 92 at the mounting region 91 on a flat portion of the optical unit, and aligning the outer peripheral surface 101 of the diffraction grating 18 with the alignment marks.

Such a diffraction grating 18 conventionally has a wide grating interval; therefore, a slight displacement of the mounting position of the diffraction grating 18 does not affect performance of the optical head assembly. Recently, however, a trend moves toward an arrangement of diffraction grating 18 and optical elements such as a photodetector in a small space by making a narrower grating interval for the diffraction grating 18 to diffract laser light at a larger angle. Consequently, performance of the optical head assembly came to be greatly dependent upon the mounting position of the diffraction grating 18. With conventional technologies, such as an alignment structure (see FIG. 7) that utilizes the outer peripheral surface 101 of the diffraction grating 18 and the inner wall of the recess portion 82 or an alignment (see FIG. 8) between the outer peripheral surface 101 of the diffraction grating 18 and the alignment marks 92, variations in outer dimension and shape of the diffraction grating 18 are immediately reflected to the displacement of the mounting position. As a result, the returning light from the optical recording medium may not be efficiently guided to the photodetector; thus, performance of the optical head assembly may be degraded.

The present inventor has filed applications of new types of optical pickup apparatus (Tokugan H8-167037, Tokugan H9-125128) in which, by using a diffraction grating having a diffraction pattern of irregular interval (modulating diffraction grating) to obtain highly precise error signals from the returning light, light emitted from the laser light source is split into three beams and guided to a converging lens, and focusing error signals are detected from the returning light from the recording surface of the recording medium. In these optical pickup apparatus, a focal length of a beam on the recording surface of the recording medium is changed by adjusting the grating interval of the diffraction grating. Also, the distance between adjacent beams of the three beams is determined by a grating position with respect to the laser light source. However, the modulating diffraction grating has a diffraction pattern of irregular interval. If the positional relationship between the grating position of the diffraction grating and the laser light source is broken in the optical head assembly which uses the above method, a predetermined focal length and beam distance cannot be obtained. Therefore, in the optical pickup apparatus having the modulating diffraction grating, a precise alignment of the diffraction grating is required. However, the conventional alignment structures cannot provide a precise in alignment to meet such a requirement.

OBJECT AND SUMMARY OF THE INVENTION

Considering the above problems, a primary object of the present invention is to provide an optical head assembly in which a diffraction grating can be placed in an optical path optimally and easily.

An optical head assembly to which the present invention is applied will be described referring to the drawings.

In accordance with the invention, an optical assembly comprises a light emitting device and an objective lens for converging light emitted from the light emitting device onto an optical recording medium. A first diffraction grating is included in which a first grating pattern is formed for diffracting said light emitted from the light emitting device to guide it to the objective lens. Also included are a light receiving element and a second diffraction grating in which a second grating pattern is formed for diffracting returning light from the optical recording medium to guide it to the light receiving element. First alignment marks are provided to either the first or second grating for aligning the diffraction grating having the marks with another element.

DESCRIPTION OF THE PREFERRED EMBODIMENTS

Embodiment 1

FIG. 1(A) illustrates a simple construction of an optical system in an optical head assembly of Embodiment 1. As illustrated in the figure, optical head assembly 1 has a laser diode 2 which is a light emitting element. Laser light Lo emitted therefrom is converged through an objective lens 4 as an optical spot on a recording surface 5a of an optical recording medium 5. The objective lens 4 is capable of moving in focusing and tracking directions. With the movement of the objective lens 4 in each direction, focusing and tracking controls are performed.

On the optical path between the laser diode 2 and objective lens 4, a first diffraction grating 12 made of a modulating diffraction grating and a second diffraction grating 11 made of a polarizing diffraction grating are arranged in this order from the laser diode 2 side. FIG. 1(B) and FIG. 1(C) respectively illustrate a grating pattern of the first diffraction grating 12 and a grating pattern of the second diffraction grating 11. The grating pattern of the second diffraction grating 11 is formed at regular interval, but the grating pattern of the first diffraction grating 12 is formed at irregular interval. The first and second diffraction gratings are placed such that diffracting directions thereof are orthogonal.

Returning to FIG. 1(A), a ¼λ plate 8 is placed next to the second diffraction grating 11 on the objective lens 4 side. In this embodiment, the polarizing direction of the laser light Lo and the crystallographic axial direction of the second diffraction grating 11 are determined so that the laser light Lo emitted from the laser diode 2 is diffracted by the first diffraction grating 12 but not by the second diffraction grating 11. The laser light Lo passes through the ¼λ plate 8 and is circularly polarized. After reflected upon the recording surface 5a of the recording medium, the laser light Lo again passes through the ¼λ plate 8 and is linearly polarized. At this time, the polarizing direction is orthogonal to the emitted laser light. For this reason, the returning light from the recording medium 5 is diffracted by the second diffraction grating 11.

The returning light from the recording medium 5 is first diffracted by the second diffraction grating 11, and then received by a photodetector 10. Based on the light intensity received by the photodetector 10, bit signals are detected, and also focusing and tracking error signals are detected.

As illustrated in FIG. 1(D), the photodetector 10 has two groups of photo detecting groups 20, 30 which are arranged symmetric about the laser diode 2. The photo detecting group 20 consists of a photodetector for detecting bit signals 21 located in the center and photodetectors for detecting focusing and tracking errors 22, 23 located on both sides of the photodetector 21. In the same manner, the other photo detecting group 30 is consists of a photodetector for detecting bit signals 31 located in the center and photodetectors for detecting focusing and tracking errors 32, 33 located on both sides of the photodetector 31. The photodetectors 22, 23, 32, and 33 are three-split-type photodetectors. In other words, the photodetector 22 has light receiving planes 22a, 22b, and 22c. In the same manner, the photodetector 23 has light receiving planes 23a, 23b, and 23c. Also, the photodetectors 32, 33 respectively have light receiving planes 32a, 32b, 32c, and 33a, 33b, 33c.

Operation of detecting optical signals in the optical head assembly 1 configured in such a manner is disclosed in detail in the above mentioned Published Gazette (Tokkai H 10-11773) of Tokugan H8-167037. Therefore, only the summary will be described referring to FIG. 1.

Figure 1:
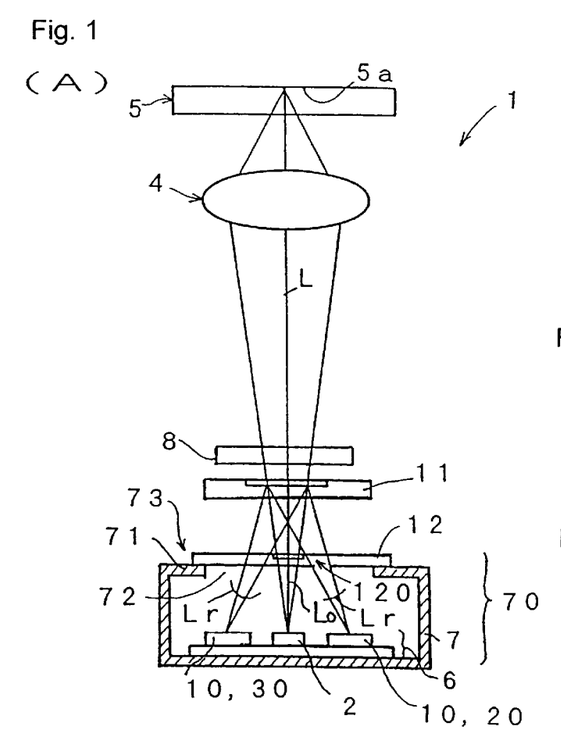
FIG. 1(A) illustrates a simple construction of an optical system of an optical head assembly of the present invention.
FIG. 1(B) is a plan view of a grating pattern of a first diffraction grating.
FIG. 1(C) is a plan view of a grating pattern of a second diffraction grating.
FIG. 1(D) is a plan view of the arrangement of photodetectors.

In the optical head assembly 1 illustrated in FIG. 1, the laser light Lo emitted from the laser diode 2 is first diffracted when passing through a diffraction pattern 120 area of the first diffraction grating 12, and split into three beams: 0th-order beam, +1st-order diffracted beam, and −1st-order diffracted beam. The diffracting direction of the first diffraction grating 12 is set to be along the direction of recording track of the recording medium. The three beams formed in such a manner pass through the second diffraction grating 11, then pass through the ¼λ plate 8 to be converted to circular polarization, and finally enter the objective lens 4. Through the objective lens 4, the three beams converge as three optical spots on the recording track formed on the recording surface 5a of the recording medium 5.

The three returning beams Lr reflected upon the recording medium 5 first passes through the objective lens 4 and then the ¼λ plate 8, at which the beams Lr are linearly polarized. However, the polarizing direction has been switched to the direction orthogonal to the laser light Lo. Therefore, the three returning beams Lr are respectively diffracted into three beams when passing through the second diffraction grating 11. The diffracting direction is orthogonal to the diffracting direction of the first diffraction grating 12, and also set to avoid the grating pattern 120 area of the first diffraction grating 12. As a result, the 0th-, +1st-, and −1st-order diffracted beams in the three returning beams Lr are respectively further diffracted to be 0th-order beam, +1st-order diffracted beam, and −1st-order diffracted beam. Therefore, the three returning beams Lr converge as optical spots a1, b1, and c1 on the light receiving planes of the photodetectors 21, 22, and 23 which make up the photo detecting group 20 in the photodetector 10, and also converge as optical spots a2, b2, and c2 on the light receiving planes of the photodetectors 31, 32, and 33. Among the optical spots formed on the recording surface of the recording medium 5, the optical spots b and c formed both sides have astigmatism generated. Therefore, depending on the focusing error direction, the width of the lateral aberration of meridional astigmatism generated at the optical spots b1, b2, c1, and c2 on the light receiving planes of the photodetector formed when the returning beams of these optical spots are focused, is changed in the opposite direction. In other words, in a focal state, the optical spots b1, b2, c1, and c2 are elliptic of the same size. However, at a front focal point where the focal point is shifted forward from the optical axis direction of the recording medium 5, while the width of the optical spots b1, b2 becomes narrower, that of the optical spots c1, c2 wider. On the other hand, at a back focal point where the focal point is shifted backward from the optical axis direction of the recording medium 5, while the width of the optical spots b1, b2 becomes wider, that of the optical spots c1, c2 narrower. Therefore, the photodetector 10 detects changes in the optical spot width as changes in light intensity received in each detector to produce focusing error signals. Note that tracking error signals are formed by a three beam method which is generally employed, and bit signals are detected based on the light intensity received by the photodetectors 21, 31 which are respectively located in the middle of the photo detecting group 20, 30.

Note that, although the photodetector 10 has two photo detecting groups 20 and 30, only one of the photo detecting group 20 or 30 is basically enough. Or, both of the photo detecting groups 20 and 30 may be provided, but tracking error signals may be detected by one thereof and focusing error signals by the other.

In the optical head assembly 1 configured in the above manner, the first diffraction grating 12 and a substrate 6, on which the laser diode 2 and photodetector 10 are formed, are mounted on a single unit case 7 to construct an optical unit 70. This optical unit 70 having these optical elements is retained by an optical head assembly main body (not illustrated).

As illustrated in FIG. 1(B), the first diffraction grating 12 has a grating pattern 120 of irregular interval. To detect signals in the optical head assembly using the above mentioned astigmatism method, it is necessary to precisely align the first diffraction grating 12 with other element. In other words, in the optical head assembly 1 in which the method described referring to FIG. 1 is used, the first diffraction grating 12 having irregular grating pattern changes the focal lengths of the beams on the recording surface 5a of the recording medium 5 and the distance between the adjacent beams in the three beams, depending on the positions thereon where the laser light Lo emitted from the laser diode 2 enters. For this reason, the first diffraction grating 12 made of a modulating diffraction grating needs to be precisely aligned on a plane of the diffraction grating mounting region 73.

Figure 2:
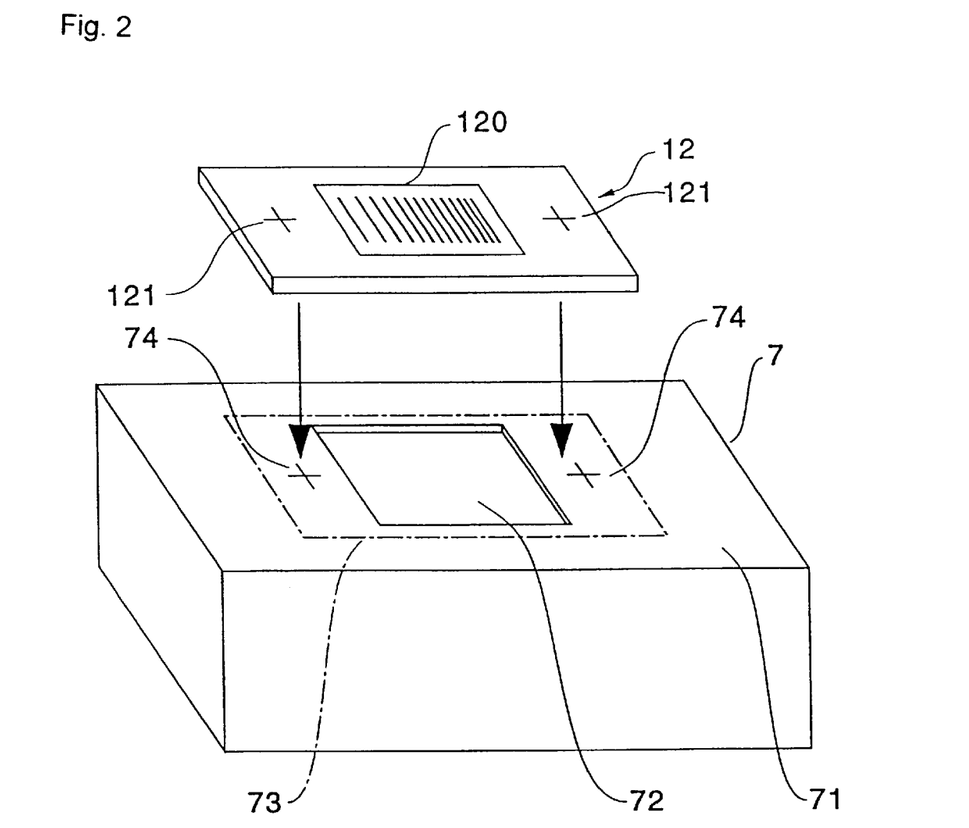
FIG. 2 is a perspective view illustrating how the diffraction grating is aligned and mounted in a unit case of an optical unit in the optical head assembly of Embodiment 1 of the present invention.

Embodiment 1 employs an alignment structure as illustrated in FIG. 2. FIG. 2 shows how the first diffraction grating 12 is installed in a unit case 7 of the optical unit 70.

In FIG. 1(A) and FIG. 2, the unit case 7 is in a box shape, and a rectangular through hole 72 is formed in the center of top surface 71 thereof. The top surface 71 is perpendicular to an optical axis L (of the assembly). Inside the unit case 7, the substrate 6 on which the laser diode 2 and photodetector 10 are formed is placed. The area around the through hole 72 in the top surface 71 of the unit case 7 is a diffraction grating mounting region 73. In other words, the first diffraction grating 12 is positioned perpendicular to the optical axis L of the assembly by being placed in the diffraction grating mounting region 73 of the unit case 7.

The diffraction grating mounting region 73 simply uses the top surface 71 of the unit case 7, where the first diffraction grating 12 is movable within the plane thereof. For this reason, the position in the diffraction grating mounting region 73 in which the first diffraction grating 12 should be mounted is ambiguous. However, in Embodiment 1, the first diffraction grating 12 is given an alignment "+" mark 121 at two places on both ends of the grating pattern 120 area. In the diffraction grating mounting region 73, i.e., on the top surface 71 of the unit case 7, a second alignment "+" mark 74 is given at two places for indicating the mounting position of the first diffraction grating 12 on the plane of the diffraction grating mounting region 73 to be aligned with the first alignment marks 121.

The positions of the second alignment marks 74 are determined based on the positions of the laser diode 2 and photodetector 10 on the substrate 6 placed inside the unit case 7.

Also the positions of the first alignment marks 121 are determined based on the grating pattern 120 area. In other words, the first alignment marks 121 are formed simultaneously in the process for forming the grating pattern 120 of the diffraction grating 12. For this reason, the positional relationship between the grating pattern 120 and first alignment marks 121 is determined directly with high precision.

Figure 3:
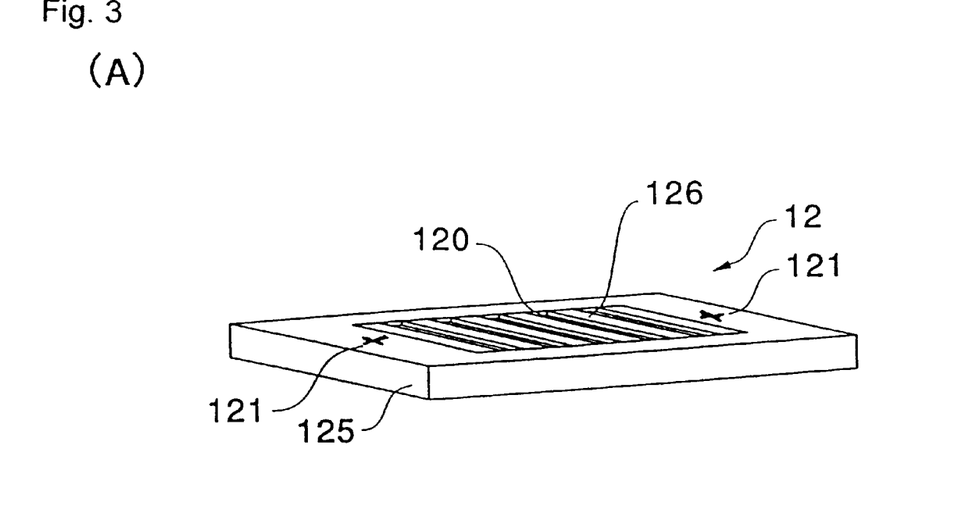
FIG. 3(A) and FIG. 3(B) respectively are perspective views of diffraction grating having different types of grating patterns.

For determining the positional relationship between the grating pattern 120 and first alignment marks 121 with such a high precision, As illustrated in FIG. 3(A), when the grating pattern 120 of the first diffraction grating 12 is made of grated grooves 126 formed in a transparent substrate 125 having optical anisotropy, grated recess-protrusion pattern for forming the grating pattern 120 as well as recess-protrusion pattern for forming the first alignment marks 121 are prepared in advance in a mold which is used for resin-molding the first diffraction grating 12. With this, the recess-protrusion pattern for forming the marks in the mold will be transferred to the diffraction grating as first alignment "+" marks 121 made by protruded portion or recessed portion. Therefore, unlike the method in which the first alignment marks 121 are formed separately after forming the grating pattern in the first diffraction grating 12, the positional relationship between the grating pattern 120 and first alignment marks 121 can be determined directly with a high precision.

As illustrated in FIG. 3(B), there is another method for forming the grating pattern 120 of the first diffraction grating 12 in which an organic film 128 having optical anisotropy is first deposited over the entire surface of a transparent optical isotropic substrate 127 by a vapor deposition method, and then patterned (etched) by photolithography. In this case, the first alignment marks 121 are formed with the organic film 128 patterned in "+" mark in the patterning process of the organic film 128 for the grating pattern 120. Therefore, unlike the method in which the grating pattern 120 is first formed in the first diffraction grating 12 and then the first alignment marks 121 are separately formed, the positional relationship between the grating pattern 120 and first alignment marks 121 can be determined directly with a high precision.

As understood from FIG. 2, the first diffraction grating 12 configured in the above manner is first mounted in the diffraction grating mounting region 73 (top surface 71) of the unit case 7, and then shifted (adjusted) in the diffraction grating mounting region 73. Finally two of first alignment marks 121 on the first diffraction grating 12 side and two of second alignment marks 74 on the diffraction grating mounting region 73 are respectively overlapped. During this adjustment, the bottom surface of the first diffraction grating 12 stays in contact with the diffraction grating mounting region 73; therefore, the position (posture) of the first diffraction grating 12 will not be angled.

This method for aligning the first diffraction grating 12 does not use the outer peripheral surface of the first diffraction grating 12 as a guide. Therefore, even when the first diffraction grating 12 has a different outer dimension and shape, such a difference will not affect the alignment of the first diffraction grating 12. Also, the grating pattern 120 and alignment marks 121 are simultaneously formed, and accordingly, the positional relationship therebetween is determined precisely. For this reason, the mounting position and direction of the first diffraction grating 12 can be determined precisely. Therefore, even when a diffraction grating, such as a modulating diffraction grating having an irregular interval pattern, the mounting position of which may affect performance of the optical head assembly 1, is used, the three returning beams Lr from the optical recording medium 5 can be guided to the photodetector 10 efficiently. Thus, the optical head assembly 1 of high performance can be obtained.

Note that, after aligning the first diffraction grating 12 within the diffraction grating mounting region 73, the first diffraction grating 12 is fixed on the top surface 71(diffraction grating mounting region 73) of the unit case 7 using adhesive and the like.

Embodiment 2

As illustrated in FIG. 4(A), in the manufacturing process of the first diffraction grating 12, when a predetermined grating pattern is etched using photolithography after forming the organic film on the surface of the transparent substrate 127, the organic film 128 may be left in a frame shape along the outer periphery of the first diffraction grating 12 and first alignment marks 121 of triangle shape pointing the grating pattern 120 area may be formed on each side of the frame portion 129. Also, in this case, if second alignment marks 74 in arrow shape, for example, are formed in advance on the diffraction grating mounting region 73 which is the top surface 71 of the unit case 7, the first diffraction grating 12 can be aligned by simply aligning each triangle portion (first alignment mark 121) with each of the second alignment marks 74 in arrow shape.

Figure 4:
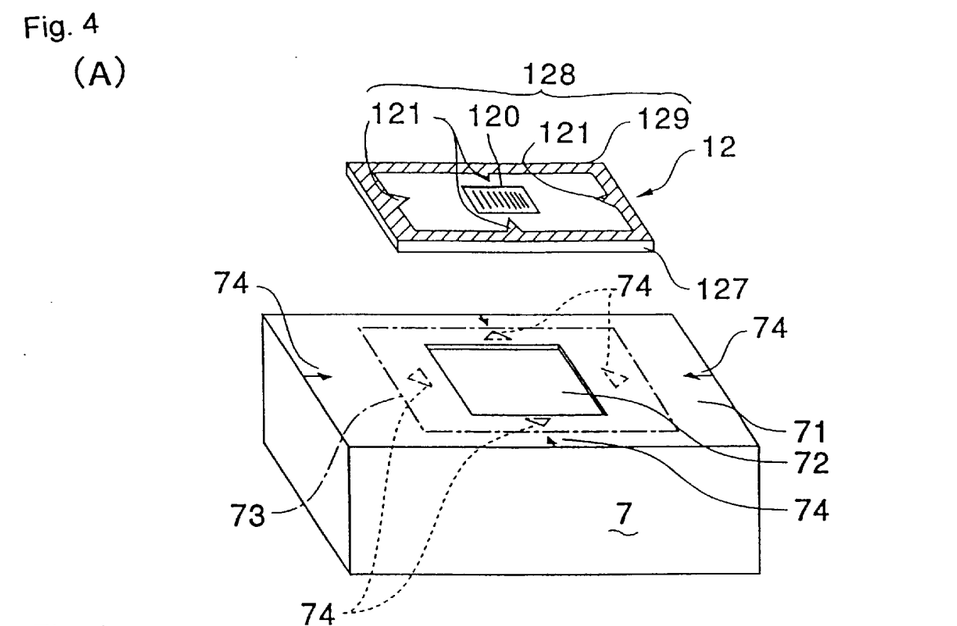
FIG. 4(A) is a perspective view illustrating how the diffraction grating is aligned and mounted in the unit case of the optical unit in the optical head assembly of Embodiment 2 of the present invention.
FIG. 4(B) is a schematic view of a manufacturing method of the diffraction grating.

In addition, the first diffraction grating 12 is made, as illustrated in FIG. 4 (B), such that each diffraction grating is made in a large transparent substrate 12A, and then the large transparent substrate 12A is cut along scribed lines 12B to bring each diffraction grating 12 out. Therefore, if the film in frame shape (frame portion 129) along the outer periphery of the first diffraction grating 12 is remained, the scribed lines 12B are automatically formed with the film and simultaneously formed with the grating pattern 120. For this reason, the first diffraction grating 12 cut along the scribed line 12B has a direct and highly precise positional relationship between the outer periphery thereof and the grating pattern 120. Even if the precision of a device that cuts the first diffraction grating 12 along the scribed line 12B is poor and therefore the precision of the outer peripheral surface of the first diffraction grating 12 is low, the first diffraction grating 12 can be still aligned with high precision because of the alignment between the first alignment marks 121 given on the first diffraction grating 12 and the second alignment marks 74 given in the diffraction grating mounting region 73 on the unit case 7.

Note that, since the first diffraction grating 12 illustrated in FIG. 4(A) is transparent except the portion having the remaining film 128 that makes the grating pattern 12 area and the first alignment marks 121, the second alignment marks 74 may be formed, not around the mounting position of the first diffraction grating 12, but in a triangle shape in the area overlapping the first diffraction grating 12 as illustrated by dotted line in FIG. 4(A).

Further Embodiments

Figure 5:
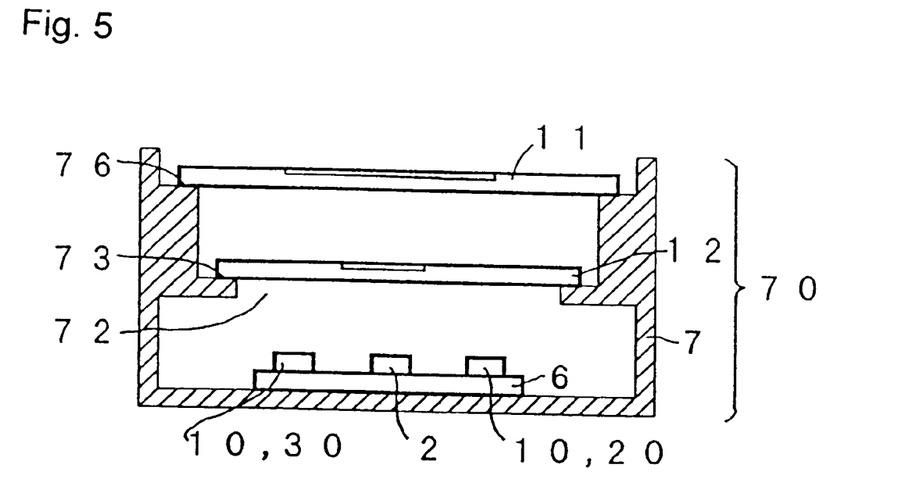
FIG. 5 is a cross-sectional view of the first diffraction grating, second diffraction grating, and substrate (including laser diode and photodetector) in the optical head assembly to which the present invention is applied.

In Embodiments 1 and 2, the first diffraction grating 12 is mounted on the unit case 7 (diffraction grating mounting region). Even when the second diffraction grating 11 is mounted on the unit case 7, the first and second alignment marks may be respectively formed on the diffraction grating and diffraction grating mounting region, and these alignment marks may be aligned to determine the mounting position of the second diffraction grating 11. For example, as illustrated in FIG. 5, the second diffraction grating 11, first diffraction grating 12, and substrate 6 (including the laser diode 2 and photodetector 10) may all be mounted in a single unit case 71 to construct an optical unit 700. In this case, each of the first and second diffraction gratings is given the first alignment marks, and the second alignment marks may be formed in the area in each diffraction mounting region 73, 76, which overlaps the diffraction grating, as illustrated by dotted line in FIG. 4(A).

When the diffraction grating is not placed in a unit, but mounted directly in the optical head assembly main body, the second alignment marks may be formed in the diffraction grating mounting region formed in the optical head assembly main body.

The second diffraction grating 11 and first diffraction grating 12 may be respectively formed on front and back surfaces of a single optical element. The present invention can be applied in an optical head assembly using such an optical element. In other words, the first alignment marks may be first formed on the first diffraction grating or second diffraction grating. By aligning the first alignment marks with the second alignment marks on the diffraction grating mounting region side, the two diffraction grating formed on a single optical element can be aligned.

Furthermore, in the above Embodiments, for aligning the diffraction grating having the first alignment marks, the first alignment marks are compared with the second alignment marks given to a close area, such as the diffraction grating mounting region. However, as illustrated in FIG. 5, the present invention may be applied to a method in which the first diffraction grating 12 is aligned with the second diffraction grating 11 spaced from the first diffraction grating 12, or the first diffraction grating 12 is aligned with the substrate 6 spaced from the first diffraction grating 12. In other words, while the first alignment marks are given to the first diffraction grating 12, the second alignment marks are given to the second diffraction 11 or substrate 6. By comparing the first alignment marks with the second alignment marks, the first diffraction grating 12 may be aligned with the component (second diffraction grating 11 or substrate 6) spaced from the first diffraction grating 12.

Figure 6:
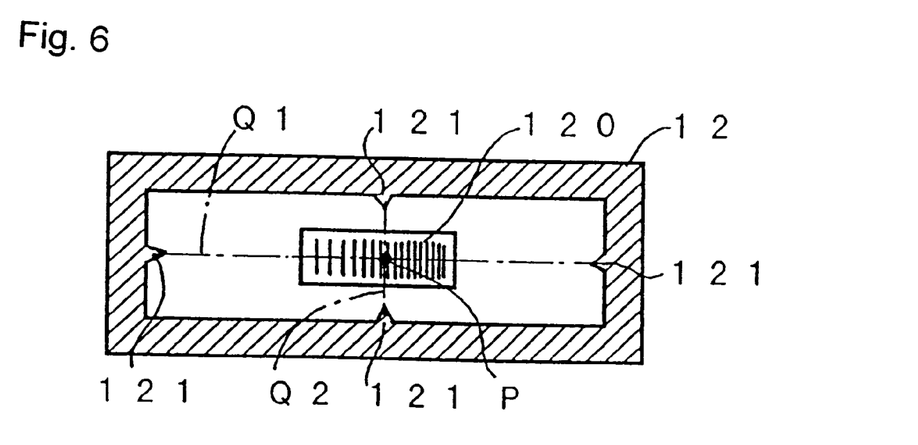
FIG. 6 is a schematic view showing an alignment method of the diffraction grating in which the alignment marks are indirectly compared (aligned) in the optical head assembly to which the present invention is applied.

The method of comparing(aligining) the first alignment marks on the diffraction grating with predetermined marks is not limited to a direct comparison (alignment) of the marks, but the marks may be indirectly compared(aligined). For example, the first diffraction grating 12 may be aligned based on an intersection P of phantom lines Q1, Q2 which are made by connecting the first alignment marks 121 formed on opposite sides in the first diffraction grating 12 illustrated in FIG. 6. For such an alignment, for example, a cross-shaped cursor is given in a finder of a CCD camera, and the first diffraction grating 12 is adjusted so that four of the first alignment marks 121 are on the cursor. Finally, other optical components can be aligned based on the intersection of the cursors.

As described above, in the optical head assembly of the present invention, the diffraction grating is aligned with other element based on the first alignment marks on the diffraction grating. Since the alignment does not depend on the outer peripheral surface of the diffraction grating, even variations in outer dimension of the diffraction grating will not affect precision of diffraction grating alignment. For this reason, the mounting position and direction of the diffraction grating can be determined precisely. Therefore, even with, for example, a modulating diffraction grating of irregular grating interval, whose mounting position may affect performance of the optical head assembly greatly, a high performance can be obtained.

While the foregoing description and drawings represent the preferred embodiments of the present invention, it will be obvious to those skilled in the art that various changes and modifications may be made therein without departing from the true spirit and scope of the present invention.

What is claimed is:

1. An optical head assembly comprising:

a light emitting device;

an objective lens for converging light emitted from said light emitting device onto an optical recording medium;

a first diffraction grating in which a first grating pattern is formed for diffracting said light emitted from said light emitting device to guide it to said objective lens;

a light receiving element; and a second diffraction grating in which a second grating pattern is formed for diffracting returning light from said optical recording medium to guide it to said light receiving element;

first alignment marks being provided to either said first or second diffraction grating for aligning said diffraction grating having said marks with another element.

2. The optical head assembly as set forth in claim 1 wherein said first diffraction grating is a modulating diffraction grating having a first grating pattern of irregular grating interval that splits said light emitted from light emitting element into three beams and guides them to said objective lens, said first alignment marks being provided to said first diffraction grating.

3. The optical head assembly as set forth in claim 1 wherein said first alignment marks are formed utilizing a process of forming said grating pattern of said diffraction grating which would have said first alignment marks.

4. The optical head assembly as set forth in claim 3 wherein said first alignment marks are made of a film which is simultaneously formed when said grating pattern of said diffraction grating that would have first alignment marks are formed in a grille film.

5. The optical head assembly as set forth in claim 1 wherein a second alignment marks being provided to said other component for alignment with said first alignment marks.

6. The optical head assembly as set forth in claim 5 wherein a diffraction grating mounting region for mounting said diffraction grating with said first alignment marks is configured such that said diffraction grating having said first alignment marks is movable in a plane of said region, and second alignment marks being given by aligning said first alignment marks with said diffraction grating mounting region for indicating a mounting position of said diffraction grating having said first alignment marks.

7. The optical head assembly as set forth in claim 6 wherein said diffraction grating having said first alignment marks is mounted in a unit case together with either said light emitting element or said light receiving element to configure an optical unit, and said diffraction grating mounting region is formed on said unit case.

8. The optical head assembly as set forth in claim 7 wherein, in said unit case, both of said first and second diffraction gratings are mounted.

9. The optical head assembly as set forth in claim 6,wherein said first and second diffraction gratings are constructed on a single unit.

* * * * *